United States Patent [19]
Yagi

[11] Patent Number: 5,910,698
[45] Date of Patent: Jun. 8, 1999

[54] METHOD AND APPARATUS FOR CONTROLLING PIEZOELECTRIC VIBRATION

[75] Inventor: Susumu Yagi, Toyama-ken, Japan

[73] Assignee: YKK Corporation, Tokyo, Japan

[21] Appl. No.: 08/905,401

[22] Filed: Aug. 4, 1997

[30] Foreign Application Priority Data

Aug. 7, 1996 [JP] Japan .................................. 8-225840

[51] Int. Cl.⁶ .................................................. H01L 41/08
[52] U.S. Cl. .......................................... 310/316; 318/116
[58] Field of Search ................................... 310/316–319; 318/116

[56] References Cited

U.S. PATENT DOCUMENTS

| | | | |
|---|---|---|---|
| 4,677,353 | 6/1987 | Shieh ....................................... | 318/128 |
| 4,868,445 | 9/1989 | Wand ....................................... | 310/316 |
| 4,879,528 | 11/1989 | Gotanda ............................... | 310/316 X |
| 4,882,525 | 11/1989 | De Meulenaer et al. ............... | 310/316 |
| 4,939,402 | 7/1990 | Hirayama et al. ....................... | 310/316 |
| 4,952,834 | 8/1990 | Okada ..................................... | 310/316 |
| 5,074,403 | 12/1991 | Myhre ..................................... | 198/751 |
| 5,372,237 | 12/1994 | Yagi ........................................ | 198/144 |
| 5,472,079 | 12/1995 | Yagi et al. ............................... | 198/162 |

FOREIGN PATENT DOCUMENTS 57-27808   2/1982   Japan .

OTHER PUBLICATIONS

Patent Abstracts of Japan, vol. 6, No. 93, May 29, 1982, JP57027808A, (Yoshida Kogyo KK) Feb. 15, 1982.

*Primary Examiner*—Mark O. Budd
*Attorney, Agent, or Firm*—Hill & Simpson

[57] ABSTRACT

Disclosed are a method of and an apparatus for controlling piezoelectric vibration in an apparatus comprising a piezoelectric vibrating element, a vibrating unit such as a parts feeder to which the piezoelectric vibrating element is attached, and a driving unit for driving the piezoelectric vibrating element. The piezoelectric vibration control is performed by vibrating the piezoelectric vibrating element at a frequency at which the vibrating unit does not vibrate substantially; detecting a voltage, a current, and a phase difference between the voltage and the current while the piezoelectric vibrating element is driven at that frequency; driving the piezoelectric vibrating element at a frequency required for actually vibrating the vibrating unit; detecting a driving voltage and a driving current while the vibrating unit is vibrated; obtaining a current component not relating to the vibration of the vibrating unit from the detected voltages, currents, and the phase difference; computing a current component relating to the vibration of the vibrating unit from the current component not relating to the vibration; and controlling the current component relating to the vibration so as to be a constant value or a desired value.

6 Claims, 8 Drawing Sheets

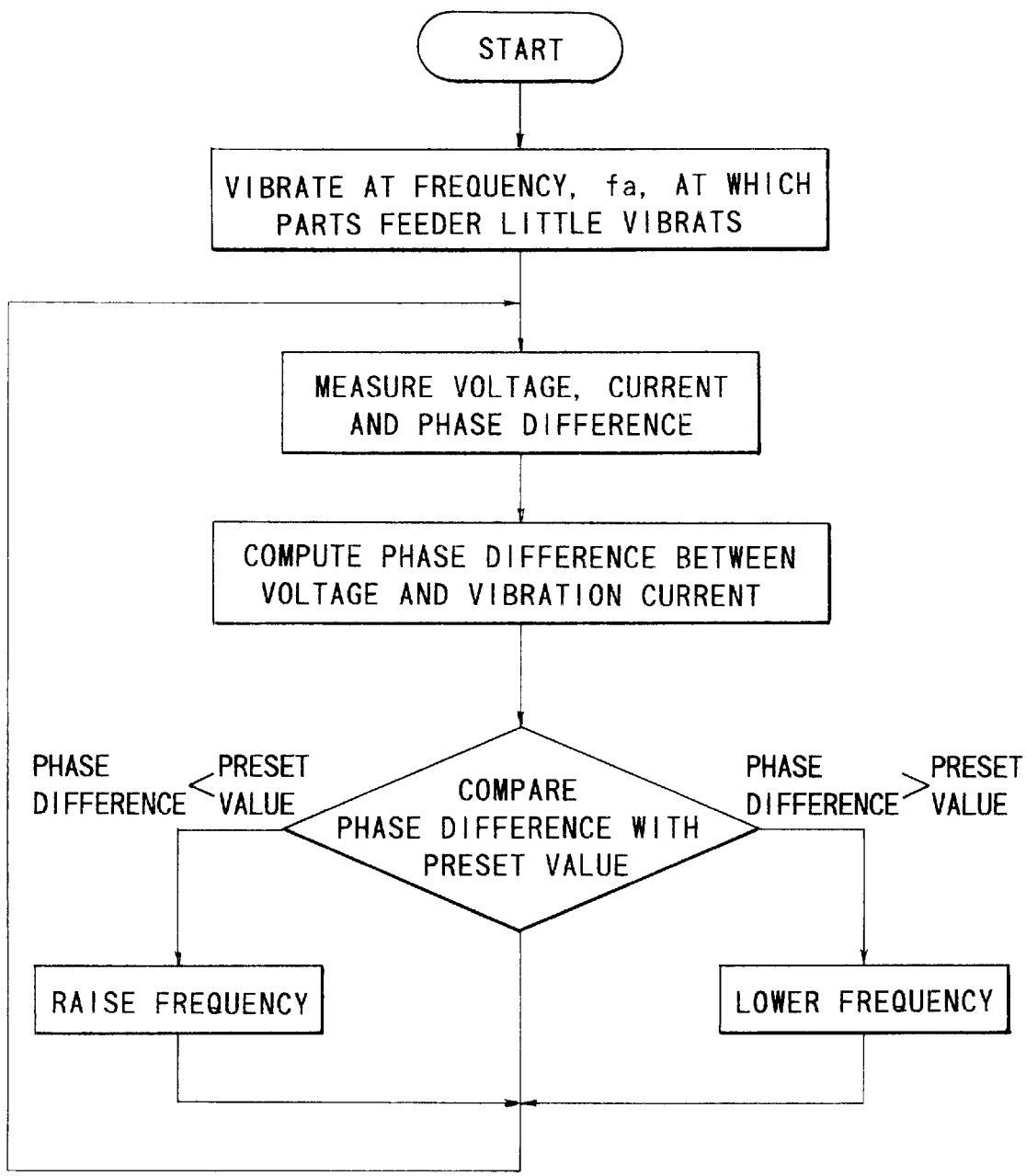

METHOD AND APPARATUS FOR CONTROLLING PIEZOELECTRIC VIBRATION

BACKGROUND OF THE INVENTION

1. Field of the Invention

The present invention relates to a method of and an apparatus for controlling piezoelectric vibration, and more particularly to a method of controlling vibration of a piezoelectric vibrator used for a parts feeder or the like to feed various types of parts by vibration as well as to a system for the same.

2. Description of the Prior Art

The conventional type of vibration control for a parts feeder having a bowl for accommodating therein parts and discharging out each of the parts by exerting vibration to the bowl, for example, as disclosed in published Japanese Patent Application, KOKAI (Early Publication) No. 57-27808, is effected by detecting the vibration of the bowl by a photoelectric transducer, feeding back an amplitude of the bowl obtained thereby to an amplitude controlling circuit, controlling a current fed to an electromagnet for driving the bowl, and driving the bowl at a constant amplitude at any time.

In another system, as disclosed in U.S. Pat. No. 5,372,237 issued Dec. 13, 1994 to Susumu Yagi, parts accommodated in a bowl are fed from a parts discharging section to a shoot due to vibration of the bowl, and when each part slides down the shoot to be fed to an assembling machine, the part passing through the shoot is detected by a photoelectric sensing element to control the parts feeding rate.

In a case of the method based on the conventional technology, the amount of parts supplied from the parts feeder varies according to changes in external environments such as a voltage or temperature, and for this reason it is quite hard to feed parts with stability. To control the parts feeding rate, the parts feeder is provided with such a sensor as a photoelectric transducer for detecting mechanical vibration or movement and converting it to an electric signal for feedback control. Accordingly, a control system becomes complicated with size of the apparatus increased, and also the cost becomes high.

SUMMARY OF THE INVENTION

Accordingly, it is an object of the present invention to provide a method of and an apparatus for controlling vibration of a piezoelectric vibrating element with simple configuration and enabling accurate vibration.

In accordance with one aspect of the present invention, there is provided a method of controlling piezoelectric vibration in an apparatus having a piezoelectric vibrating element, a vibrating unit such as a parts feeder to which the piezoelectric vibrating element is attached, and a driving unit for driving the piezoelectric vibrating element, which method comprises the steps of vibrating the piezoelectric vibrating element at a frequency at which the vibrating unit does not vibrate substantially; detecting a voltage, a current, and a phase difference between the voltage and the current while the piezoelectric vibrating element is driven at that frequency; driving the piezoelectric vibrating element at a frequency required for actually vibrating the vibrating unit; detecting a driving voltage and a driving current while the vibrating unit is vibrated; obtaining a current component not relating to the vibration of the vibrating unit from the detected voltages, currents, and the phase difference; computing a current component relating to the vibration of the vibrating unit from the current component not relating to the vibration; and controlling the current component relating to the vibration so as to be a constant value or a desired value.

In another aspect the present invention provides a system for controlling piezoelectric vibration in an apparatus having a piezoelectric vibrating element, an vibrating unit such as a parts feeder to which the piezoelectric vibrating element is attached, and a driving unit for driving the piezoelectric vibrating element. The control system comprises a detector for detecting a voltage as well as a current for driving the piezoelectric vibrating element, a non-vibration current component computing means for obtaining a current not relating to the actual vibration of the vibrating unit (non-vibration current component) based on the detected values while the vibrating unit is driven, a vibration current component computing means for computing a current component relating to the vibration of the vibrating unit from the obtained non-vibration current component, and a vibration current controlling means for controlling the vibration current component so as to be a constant value or a desired value.

In the method of and the apparatus for controlling piezoelectric vibration according to the present invention, the vibration is directly controlled based on a driving current without using any sensor for detecting mechanical vibration, so that configuration thereof can be simplified and accurate control can be performed.

BRIEF DESCRIPTION OF THE DRAWINGS

Other objects, features, and advantages of the invention will become apparent from the following description taken together with the drawings, in which:

FIG. 9 is a flowchart showing control contents in a piezoelectric vibration control system according to a second embodiment of the present invention.

DETAILED DESCRIPTION OF THE PREFERRED EMBODIMENTS

Figure 1:
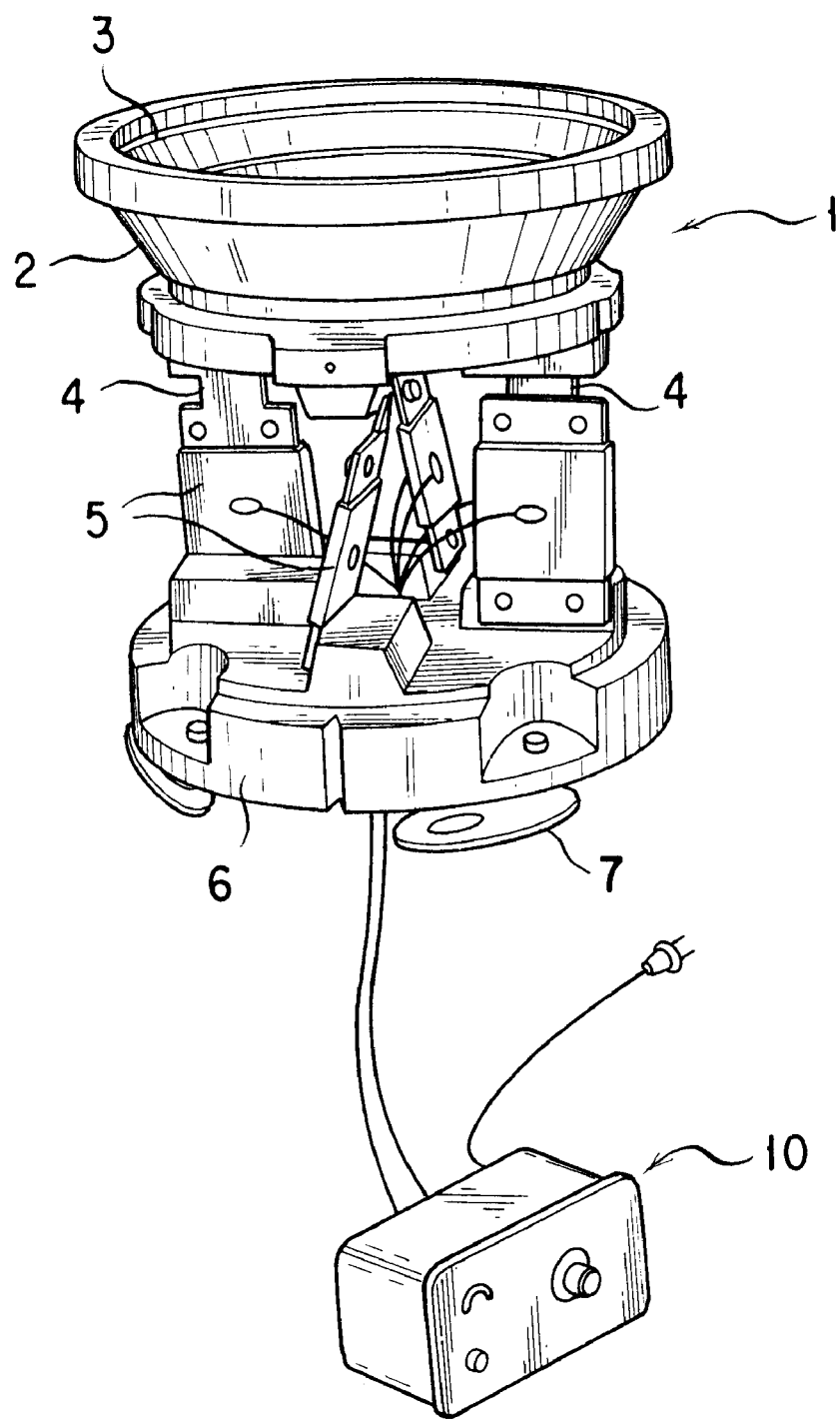
FIG. 1 is a diagramatical perspective view of a conventional piezoelectric vibratory parts feeder incorporating therein a controller according to the present invention.

Referring to the drawings, FIG. 1 illustrates the general construction of a piezoelectric vibratory parts feeder incorporating therein a controller 10 according to the present invention. The parts feeder is substantially the same in construction as the conventional parts feeder. Briefly stated, the parts feeder 1 comprises a bowl 2 provided with a side wall having a spiral parts feed track 3 formed on the inner peripheral surface thereof in the form of the gently upwardly sloping surface and a plurality of plate springs 4 attached at their upper ends to the underside of the bowl 2 with a predetermined angle formed therebetween. The lower ends of the respective plate springs 4 are directly connected to the upper ends of the corresponding piezoelectric vibrating elements 5. The lower ends of the piezoelectric vibrating elements 5 are secured to a base portion 6 at the same angle as the upper ends thereof. The piezoelectric vibrating elements 5 oscillate or vibrate when an electric power form a power supply is intermittently supplied to the piezoelectric vibrating elements 5. The oscillation or vibration of the piezoelectric vibrating elements 5 is transmitted via the plate springs 4 to the bowl 2 of the parts feeder 1. The base portion 6 is fixedly mounted on the floor surface via cushioning or damping members 7. The piezoelectric vibrating elements 5 jointly form a piezoelectric driving unit which constitutes a main portion of a vibration generating unit. The operation of the parts feeder is described, for example, in U.S. Pat. No. 5,472,079 issued Dec. 5, 1995 to Yagi et al., the teachings of which are hereby incorporated by reference.

Figure 2:
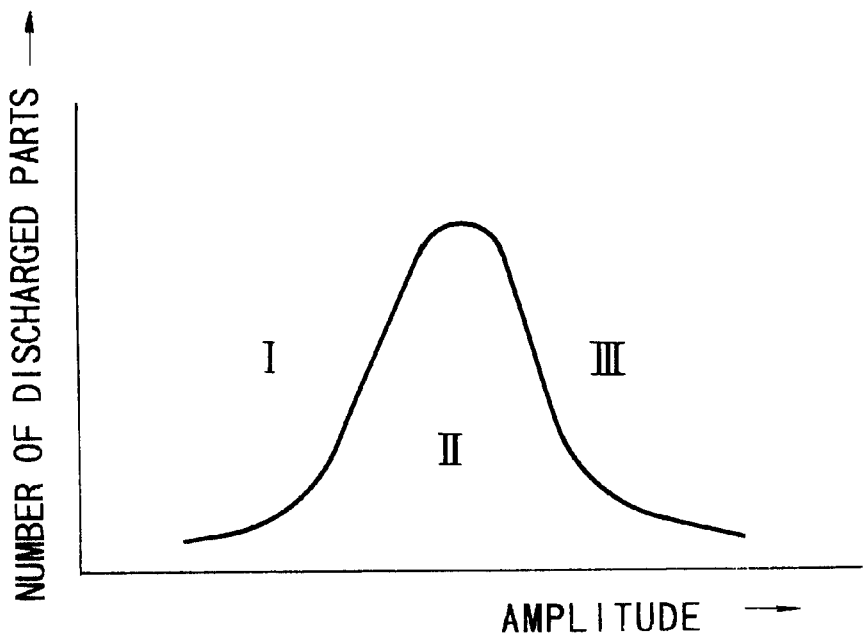
FIG. 2 is a graph showing a general relation between a vibration amplitude of a vibratory parts feeder and the number of discharged parts.

In general, there is a relation as shown in FIG. 2 between a vibration amplitude of a vibratory parts feeder and the number of discharged parts. In the area I shown in FIG. 2, since vibration of the parts feeder is weak and the speed of a part climbing up the feed track 3 of the bowl 2 is slow, only a small number of parts are discharged. On the other hand, although the vibration is strong in the area III and the speed of the part is fast, the part drops in the bowl 2 at a touring section (alignment section) of the parts feeder 1, which results in discharging a small number of parts therefrom. Accordingly, it is necessary to control the amplitude of the parts feeder so that it will be within the optimum area II. However, the amplitude may be changed depending on fluctuations in weight of parts or on change in temperature in the circumstances even under the same voltage, current, and frequency. Therefore, in the conventional technology, a sensor for detecting the amplitude is attached to the main body of the parts feeder 1 so as to control the vibration of the parts feeder at a constant amplitude according to feedback control. The present invention aims to accurately control vibration of a vibrating unit using a piezoelectric vibrating element without using the sensor as described above.

Figure 3:
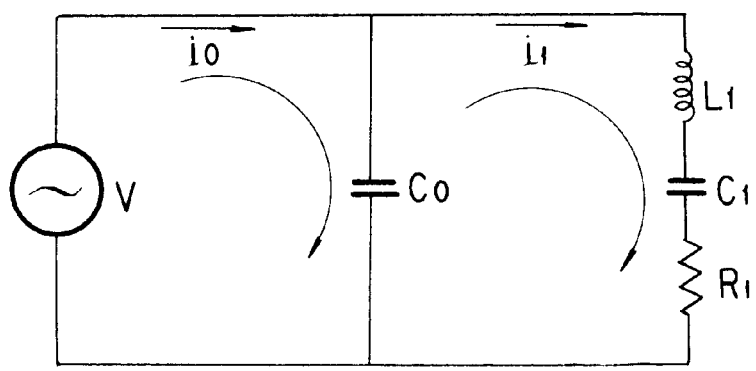
FIG. 3 is an equivalent circuit diagram of a piezoelectric vibratory parts feeder.

An equivalent circuit of the piezoelectric vibrating unit, for instance, the piezoelectric vibratory parts feeder is generally represented as shown in FIG. 3. In FIG. 3, the reference character $i_f$ indicates a current in proportion to mechanical vibration, and the reference character $i_o$ indicates a current not relating to the vibration. If the current relating to the vibration (hereinafter referred to as the "vibration current") $i_f$ is separated from the current $i_t$ actually measured and the vibration current $i_f$ is controlled so that it is held at a constant value, the vibrating unit can be vibrated at a constant amplitude because there is a linear and proportional correlation between an amplitude of a piezoelectric vibrating element and the vibration current. This vibration current $i_f$ can be obtained by calculation from the equation (1) described below, wherein the current $i_o$ is measured when the piezoelectric vibrating element is driven at a frequency at which the vibrating unit little vibrates, and the current (total current) $i_t$ is measured when the vibrating unit is then actually vibrated.

$$\vec{i}_f = \vec{i}_t - \vec{i}_o \qquad (1)$$

Figure 4:
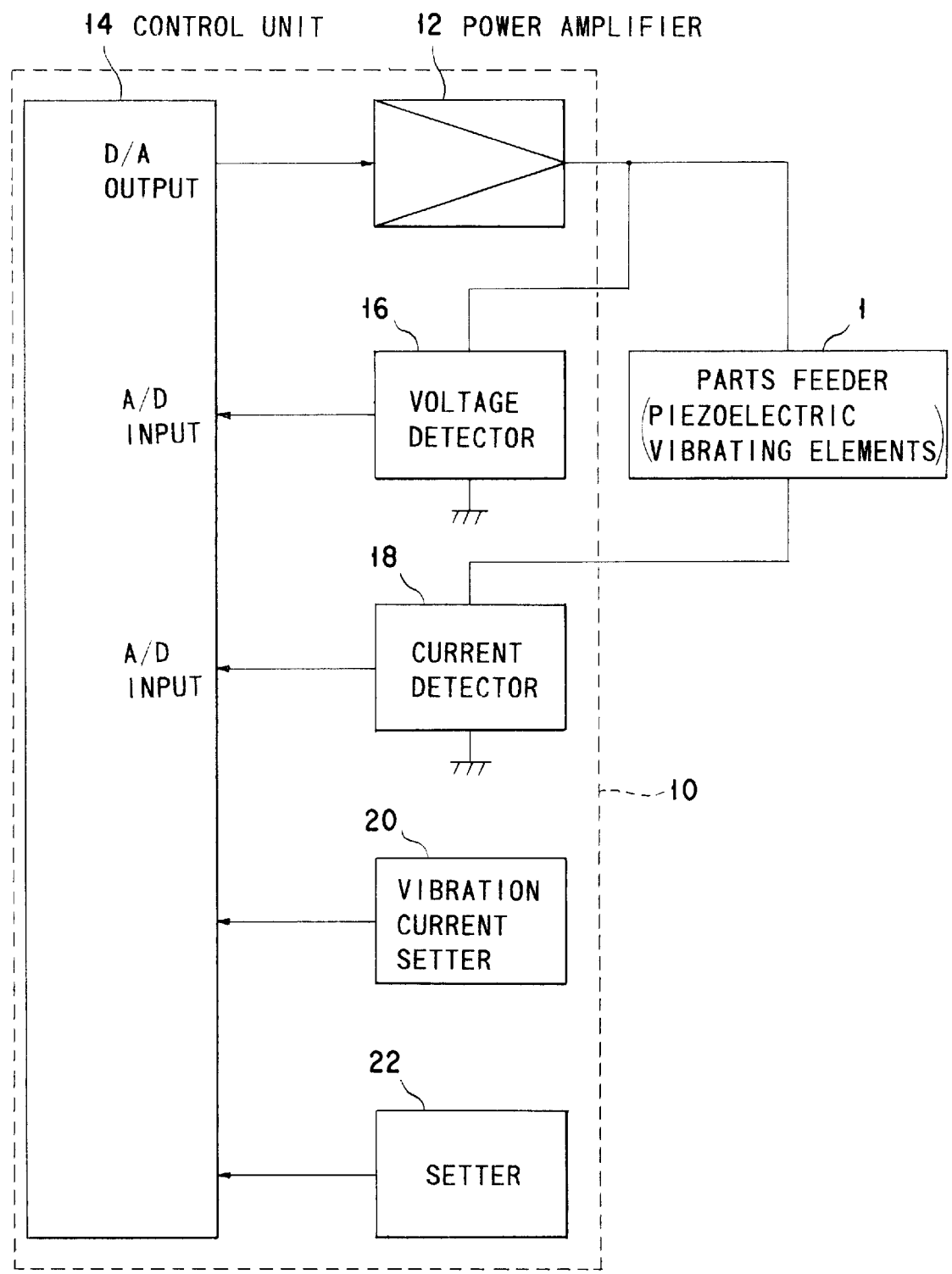
FIG. 4 is a schematic block diagram of a piezoelectric vibration control system according to a first embodiment of the present invention incorporated in a body of the controller.

Description is made hereinafter for the first embodiment of the present invention with reference to the related drawings. The piezoelectric vibration control system of this embodiment is, as shown in FIG. 4, directed to the parts feeder 1 as a vibrating unit for feeding various types of parts to a machine and includes the parts feeder 1 shown in FIG. 1, a power amplifier 12 which is a driving unit for driving the parts feeder 1, and a control unit 14 for outputting a drive signal to the power amplifier 12. The parts feeder 1 is provided with the piezoelectric vibrating elements 5 as shown in FIG. 1 and these piezoelectric vibrating elements 5 are vibrated by a driving power fed from the power amplifier 12. Further, the piezoelectric vibrating elements 5 of the parts feeder 1 are connected to a voltage detector 16 as well as to a current detector 18, and each output from the voltage detector 16 and current detector 18 is inputted to the control unit 14.

An output terminal of a vibration current setter 20 for setting an amplitude of the piezoelectric vibrating elements 5 of the parts feeder 1 is connected to the control unit 14. Further, as shown in a second embodiment described hereinafter, in a case where frequency control is to be provided, an output terminal of a setter 22 for setting a frequency or an amplitude phase is also connected to the control unit 14.

Figure 5:
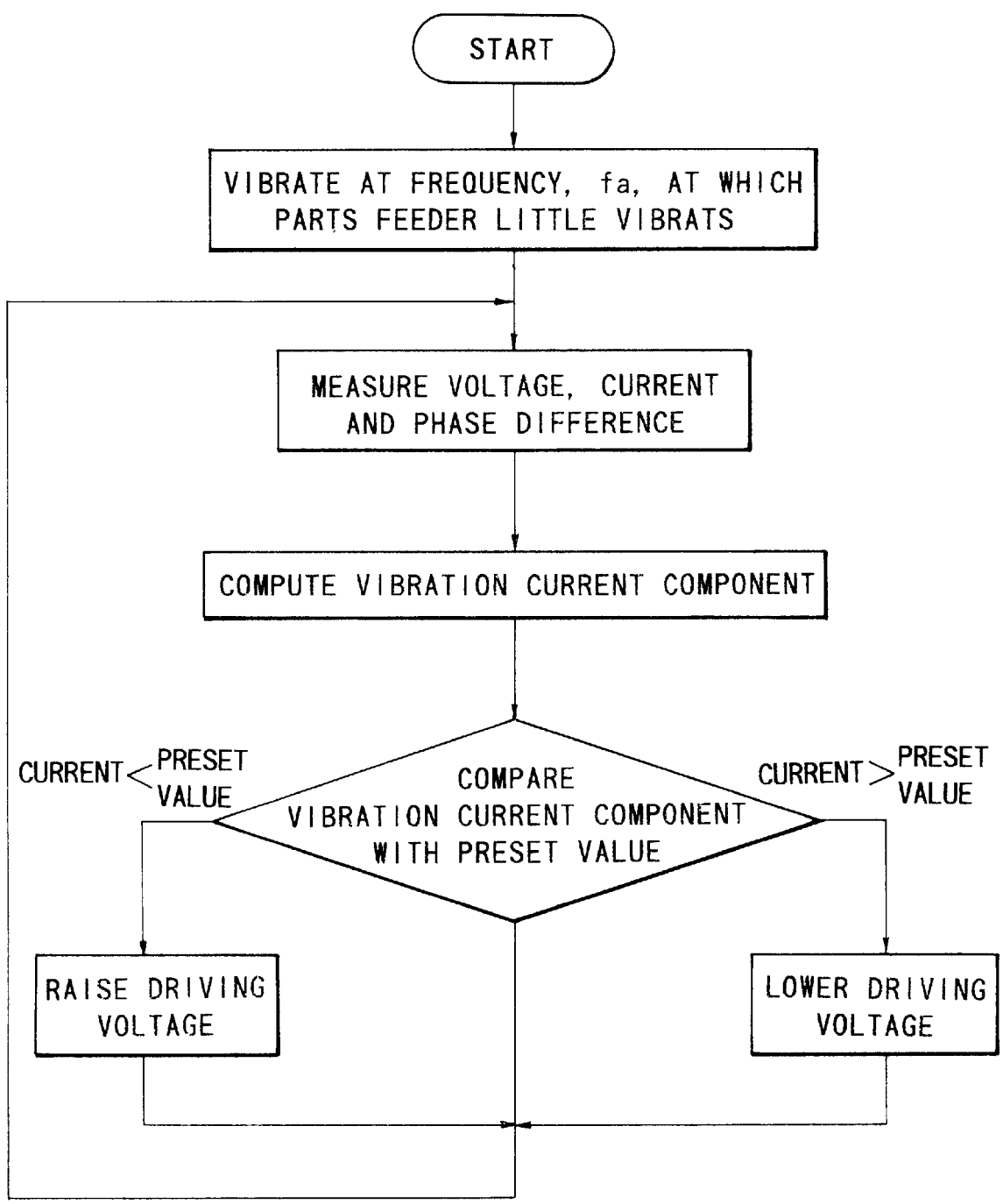
FIG. 5 is a flowchart showing a control sequence in the piezoelectric vibration control system according to the embodiment shown in FIG. 4.
Figure 6:
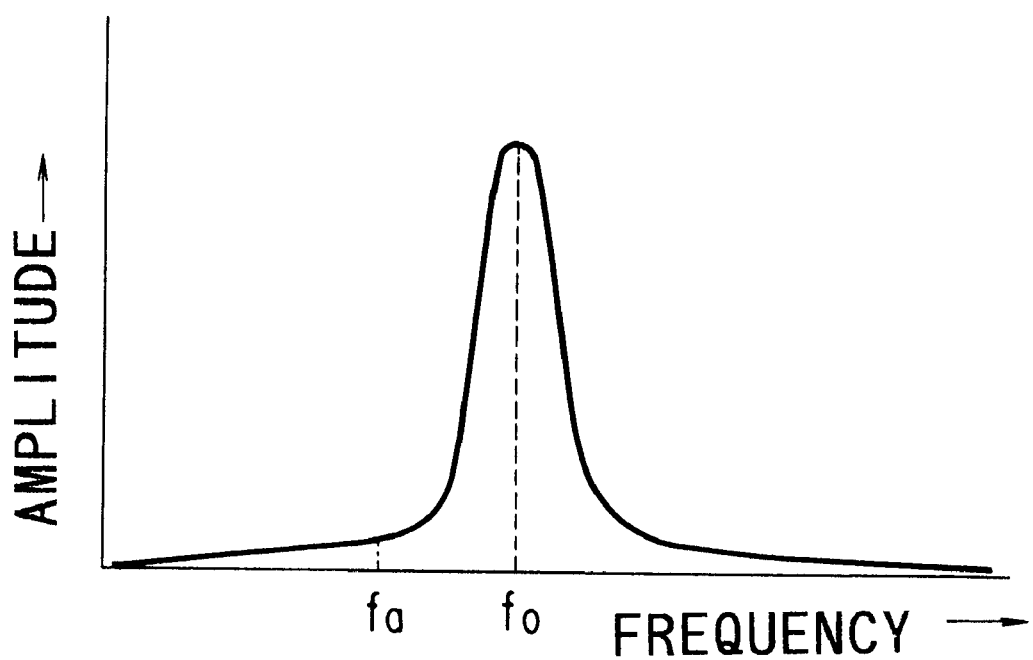
FIG. 6 is a graph showing a general frequency characteristic of a vibration amplitude of the piezoelectric vibratory parts feeder.
Figure 7:
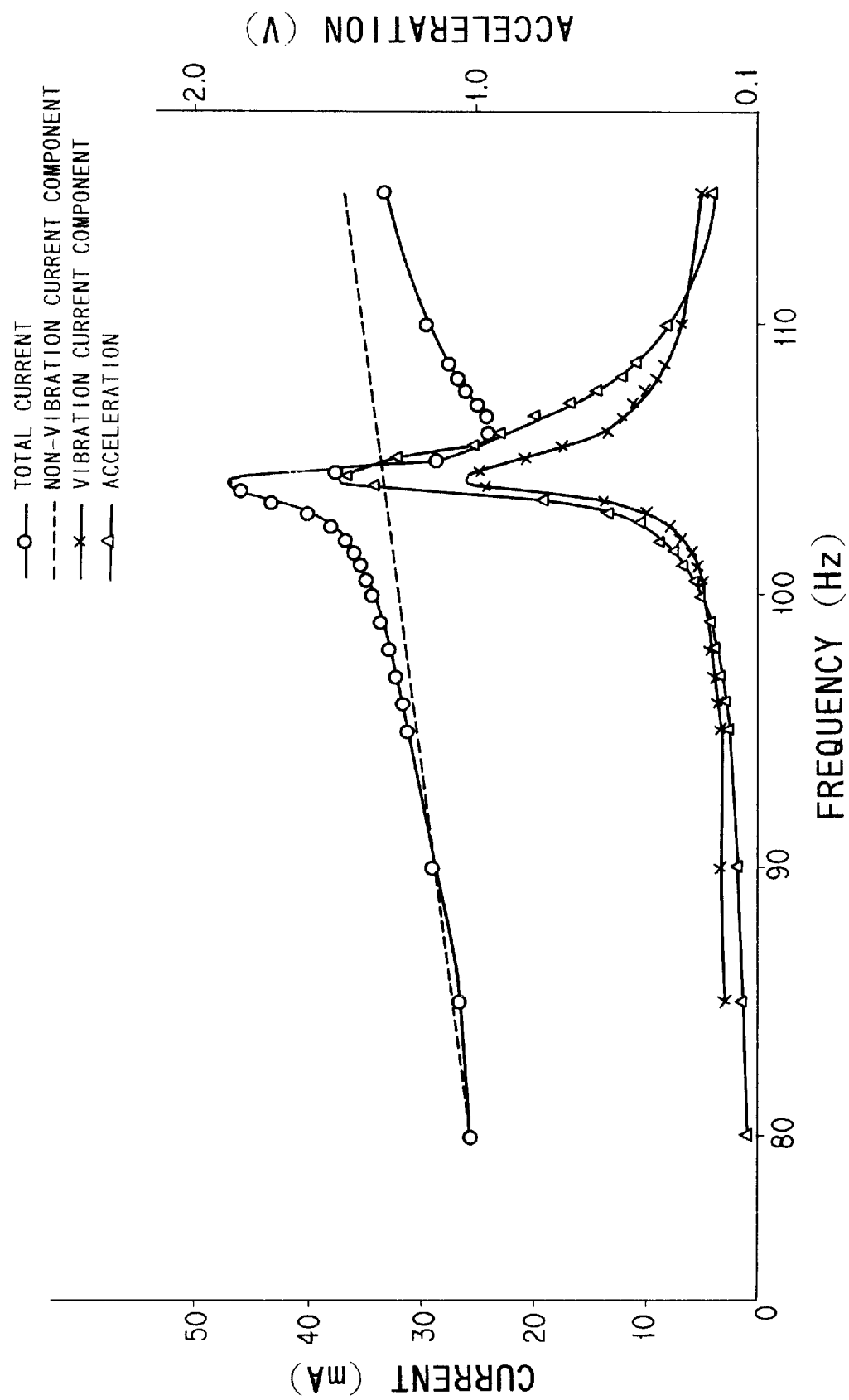
FIG. 7 is a graph showing frequency characteristics of currents and acceleration of the parts feeder according to the embodiment shown in FIG. 4.

The controlling method of piezoelectric vibration control system according to the embodiment is executed in the sequence as shown in FIG. 5. Since a frequency characteristic of an amplitude of the parts feeder is as shown in FIG. 6, at first, the piezoelectric vibrating elements 5 of the parts feeder 1 are driven at a frequency, fa, which is lower than the actual driving frequency and at which the parts feeder 1 hardly vibrates, and the voltage, Va, the current, Ia, and a phase difference, θ, therebetween are detected while the piezoelectric vibrating elements are driven at that frequency. The current Ia is substantially equivalent to the current not relating to the vibration (non-vibration current) as shown in FIG. 7 because vibration of the parts feeder is not generated. Then, the piezoelectric vibrating elements are driven at a frequency, fb, required for actually vibrating the parts feeder 1, and the driving voltage, Vb, and the driving current, Ib (total current) at the time of the actual vibration of the parts feeder are detected. The current component, $Ib_o$, not relating to the actual vibration is obtained according to the equation (2) described below from the detected driving voltage Vb and the voltage Va, current Ia, and phase difference θ each detected at the frequency, fa, at which the parts feeder hardly oscillates, and the vibration current component $Ib_f$ at the time of the actual vibration is computed according to the equation (3) described below from the non-vibration current component $Ib_o$ and the driving current Ib.

$$Ib_0 = \frac{Vb \cdot fb}{Va \cdot fa} \times Ia \qquad (2)$$

wherein the currents $Ib_o$ and Ia indicate vectors.

Figure 8:
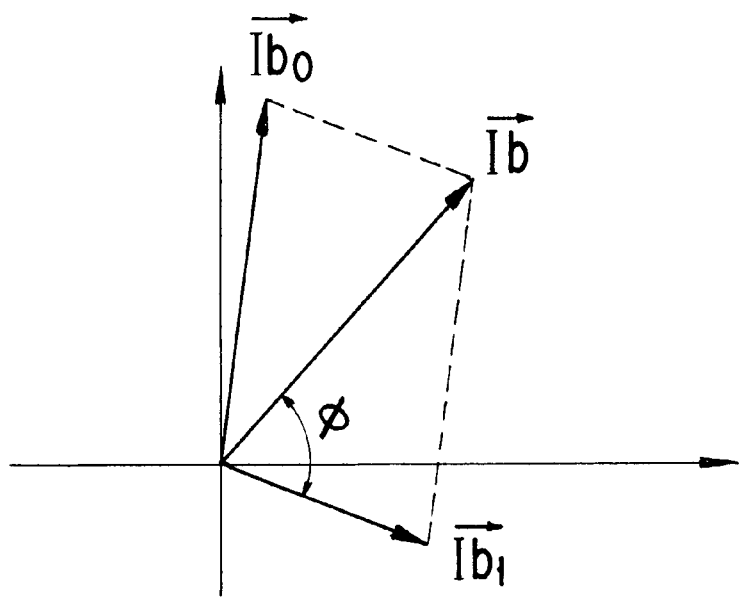
FIG. 8 is a vector diagram of the current components under the control of the piezoelectric vibration control system according to the embodiment shown in FIG. 4.

The vibration current $Ib_f$ is expressed as follows:

$$Ib_f = Ib - Ib_o \qquad (3)$$

and the vector $Ib_f$ can be obtained thereby as shown in FIG. 8.

In FIG. 7 showing frequency characteristics (sinusoidal wave drive) of currents and acceleration, the total current and the acceleration are measured values, while the non-vibration current is a value obtained from the equation (2) and the vibration current is a value obtained from the equation (3) mentioned above.

The vibration current component $Ib_I$ obtained as described above is adjusted so that a parts feeder is driven at the most efficient and stable amplitude for discharging parts out. If the amplitude is too small, in the case of the parts feeder 1, efficiency is so low that parts do not move much and only a small number of pieces is discharged, and on the contrary, if the amplitude is too large, some of the parts drop in an aligning process thereof, which also causes the number of discharged pieces to be reduced. Accordingly, it is required to set the amplitude to a value at which parts can efficiently be fed and discharged out according to the type of the parts. Since there is a substantially linear and relative relation between the amplitude and the vibration current $Ib_I$, the amplitude can accurately be controlled by controlling the vibration current component $Ib_I$.

In the control of the vibration current component $Ib_I$, as shown in FIG. 5, in a case where the obtained value of the vibration current component $Ib_I$ is smaller than the preset value, a driving voltage is increased, while, in a case where the vibration current component $Ib_I$ is larger than the preset value, the driving voltage is reduced. Then, the continuance of the control can control the amplitude so as to be an optimum value.

With the method of and the apparatus for controlling vibration of the piezoelectric vibrating elements according to the embodiment, an object to be controlled as an electric signal is detected based on a driving current of the piezoelectric vibrating elements to control a driving voltage without using any sensor for sensing a mechanical vibration to be converted to an electric signal, which makes it possible to simplify the configuration as well as to accurately control an amplitude.

Next description is made for the second embodiment of the piezoelectric vibration control system according to the present invention with reference to FIG. 9. The method of and the apparatus for controlling piezoelectric vibration according to this embodiment are the same as those in the first embodiment and the controls are carried out as shown in FIG. 9. In this controlling method, as in the embodiment described above, the piezoelectric vibrating elements 5 of the parts feeder 1 are vibrated at a frequency, fa, which is lower than the actual driving frequency and at which the parts feeder 1 hardly vibrates, a voltage Va, a current Ia, and a phase difference $\theta_a$ therebetween are detected while the piezoelectric vibrating elemans are driven at that frequency. Then, a driving voltage Vb and a driving current Ib are detected when the parts feeder 1 is actually vibrated. A vibration current component $Ib_I$ is obtained by calculation from the equations (2) and (3) mentioned above and a phase difference $\theta_b$ between the vibration current $Ib_I$ and the driving voltage Vb is computed. This phase difference $\theta_b$ is compared to a prescribed preset value. If it is found that the phase difference $\theta_b$ is smaller than the preset value, the driving frequency is increased, while if it is found that it is larger than the preset value, the frequency is reduced.

Figure 10:
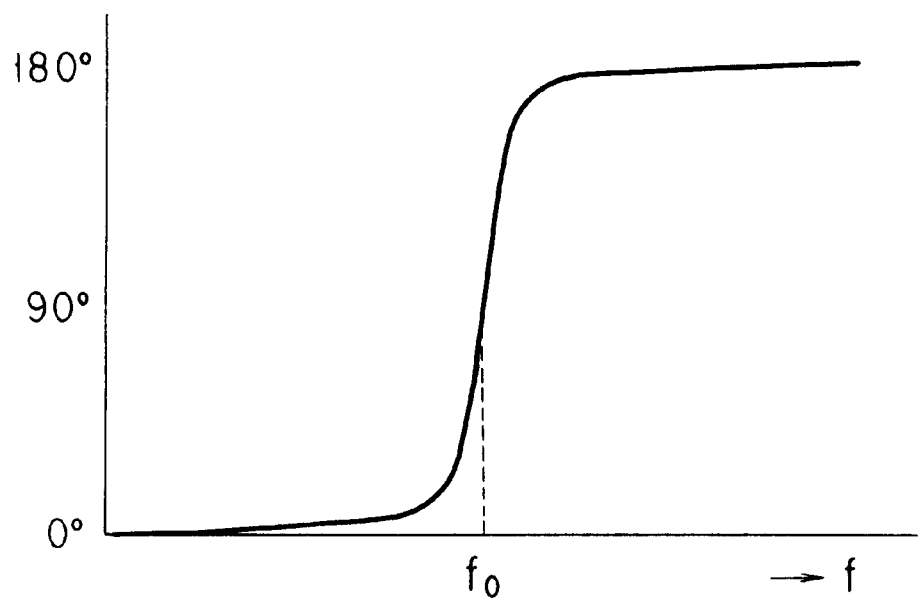
FIG. 10 is a graph showing a frequency characteristic of a delay in displacement of the piezoelectric vibrating element against an exciting force.

The above controls are executed by making using the fact that the vibration of the piezoelectric vibrating element at a resonance point is delayed by 90 degrees in phase to the vibration of the driving current and is identical to a phase of the vibration current $Ib_I$ relating to the vibration. Namely, a phase lag of displacement in the piezoelectric vibrating element to an exciting force F ($=F_o \sin \omega t$) is generally in a relation as shown in FIG. 10, so that the phase is delayed by 90 degrees to the exciting force at the resonance point $f_o$.

On the other hand, the phase of the vibration current $Ib_I$ and the phase of the actual displacement in the piezoelectric vibrating element are identical to each other. Accordingly, by detecting the deviation of the phase and controlling a frequency of a driving signal, the piezoelectric vibrating element can always be driven at a resonance frequency.

It should be noted that, in a case where the peizoelectric vibrating element is of a self-excited vibration type, an accurate vibration can be obtained if the phase of the vibration current $Ib_I$ is designed to be delayed by 90 degrees in phase ($\phi$ shown in FIG. 8) to the phase of the driving current. In this case, the setting device 22 is used for setting an amplitude phase. In a case where the piezoelectric vibrating element is of a separately excited vibration type, a user sets a frequency at a prescribed value. In this case, an accurate phase control can also be performed by detecting a phase in the vibration current. Then the frequency is set by the setting device 22.

With this embodiment, an accurate frequency control can also be performed, as is in the first embodiment, without using any complicated sensor.

It should be noted that the present invention is not limited to the embodiments as described above. The present invention is generally applicable not only to a parts feeder but also to any apparatus using a piezoelectric vibrating element. The described embodiments are therefore to be considered in all respects as illustrative and not restrictive, the scope of the invention being indicated by the appended claims rather than by the foregoing description and all changes which come within the meaning and range of equivalency of the claims are, therefore, intended to be embraced therein.

What is claimed is:

1. A method of controlling piezoelectric vibration in an apparatus comprising a piezoelectric vibrating element, a vibrating unit to which the piezoelectric vibrating element is attached, and a driving unit for driving the piezoelectric vibrating element, which method comprising the steps of:

vibrating said piezoelectric vibrating element at a frequency at which said vibrating unit does not vibrate substantially;

detecting a voltage, a current, and a phase difference between the voltage and the current while the piezoelectric vibrating element is driven at said frequency;

driving said piezoelectric vibrating element at a frequency required for actually vibrating the vibrating unit;

detecting a driving voltage and a driving current while said vibrating unit is vibrated;

obtaining a current component not relating to vibration of the vibrating unit from said detected voltages, currents and the phase difference;

computing a current component relating to said vibration of the vibrating unit from the current component not relating to said vibration; and controlling the current component relating to said vibration so as to be a prescribed value.

2. The method according to claim 1, wherein a driving voltage is adjusted so that the current component relating to the vibration will be a constant value.

3. The method according to claim 1, wherein a driving frequency is adjusted so that a phase difference between the current relating to said vibration and the driving voltage will be a prescribed value.

4. The method according to claim 1, wherein a phase of the current relating to said vibration is adjusted so as to be delayed by 90 degrees in phase to a phase of the driving current.

5. A piezoelectric vibration control system in an apparatus comprising a piezoelectric vibrating element, a vibrating unit to which said piezoelectric vibrating element is attached, and a driving unit for driving said piezoelectric vibrating element, which system comprising:
- a detector for detecting a voltage and a current for driving said piezoelectric vibrating element;
- a non-vibration current component computing means for obtaining a current component not relating to vibration of said vibrating unit based on detected values while said vibrating unit is driven;
- a vibration current component computing means for computing a current component relating to the vibration of said vibrating unit from said non-vibration current component; and
- a vibration current controlling means for controlling said vibration current component so as to be a prescribed value.

6. The system according to claim 5, wherein said vibrating unit is a vibratory parts feeder.

* * * * *